United States Patent Office 3,288,786
Patented Nov. 29, 1966

3,288,786
NAPHTHOTRIAZOLE OPTICAL BRIGHTENERS
Albert F. Strobel, Delmar, and Sigmund C. Catino, Castleton, N.Y., assignors to General Aniline & Film Corporation, New York, N.Y., a corporation of Delaware
No Drawing. Filed Sept. 10, 1962, Ser. No. 222,657
2 Claims. (Cl. 260—240)

This application is a continuation-in-part of our application Ser. No. 776,761, filed November 28, 1958.

This invention relates to novel fluorescent naphthotriazole compounds possessing new and useful properties which render them particularly useful as fluorescing optical bleaching or whitening agents for fine fabrics.

It as well established that textiles tend to develop a yellowish shade on ageing which cannot be removed by ordinary methods of bleaching or washing. The heretofore used methods of "blueing" white materials with blue pigments or fugitive blue dyestuffs have become quite obsolete in modern laundry practice and have been largely superceded by methods employing fluorescent optical bleaching agents or brighteners as additives to the soap or detergent in the washing bath. These brightening agents are usually conveniently supplied commercially in the form of intimate admixtures with the soap or detergent in bars, flakes, powders, etc. The fluorescent optical bleaching agents perform their desired function by virtue of their characteristic absorption of ultraviolet radiations and subsequent conversion of this energy to light energy within the visible spectrum. This converted and emitted light energy tends to neutralize any yellowness of the material and thereby increase the apparent whiteness thereof.

It is known that blue-fluorescing 2-(4-styrylphenyl)-2H-naphtho[1,2]triazole compounds (containing a sulfonic acid group in the stilbene nucleus) can be used from a neutral to a weakly acid bath for the brightening of wool, cellulose fibers, and linear polyamide and polyurethane fibers. None of them, however, have appreciable affinity for the synthetic fibers (Terylene; Dacron) made from terephthalic acid and ethylene glycol either by direct esterification or by catalyzed ester-interchange. The lack of affinity is probably due to the fact that Dacron being a strongly hydrophobic material is not penetrated by these relatively water soluble sulfonated products.

It is also known that the sulfonic acid substituent in the stilbene nucleus of the above foregoing 2-(4-styrylphenyl)-2H-naphtho[1,2]triazoles can be replaced by sulfone and sulfonamide groups to produce optical brightening agents which are useful for example in brightening paraffin, polymeric synthetic materials such as polyvinyl chloride, polyacrylonitrile, polyacrylic acid esters and copolymers of these materials, cosmetic preparations, ointment bases and the like. They are also useful in brightening polyester fibers such as Dacron.

We have now discovered that when the diazo of certain chlorinated stilbeneamines are employed in the coupling with an azo component, such as 2-naphthylamine, followed by oxidation of the monoazo dye, fluorescent naphthotriazoles are obtained which are especially unusual in that they have affinity for Dacron and superior brightening power on Dacron over the corresponding sulfone and sulfonamide substituted 2-(4-styrylphenyl)-2H-naphtho[1,2]triazoles. In fact, we have found that these new triazoles have the highest brightness and whitening power in textile application on ethylene glycol-terephthalic acid polyester fabric of any brightener we have experimented with either with our own synthesis or with competitive products. It is interesting to note that these compounds are outstanding on cellulose acetate, cellulose triacetate, nylon and Dacron.

The fluorescent naphthotriazoles prepared in accordance with the present invention are characterized by the following general formula:

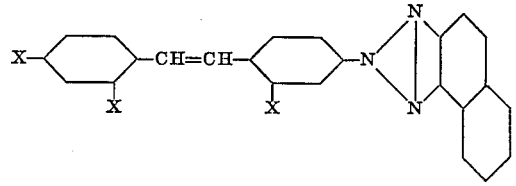

wherein X represents either hydrogen or chlorine, at least one of the X's being chlorine.

The naphthotriazoles having the foregoing general formula are prepared by dissolving a stilbeneamine of the formula:

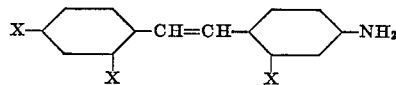

wherein X has the same value as above, in glacial acetic acid, and diazotizing by adding hydrochloric acid and sodium nitrite. After diazotization is complete, 2-naphthylamine, as the hydrochloride or as a slurry, is added to the diazo in equimolar amount. After coupling has occurred, the monoazo dye is oxidized to the triazole, for for example, by heating with copper sulfate in a basic solvent such as pyridine or picoline. The brightener is isolated by first precipitating and filtering the copper as the sulfide and then separating from the solvent either by steam distillation or by dilution with water and cooling, and then filtering. The brightening agent is applied to the fabric in a dispersed form. The dispersion may be made by kneading the brightener with a suitable dispersing agent in a Werner-Pfleiderer mixer, or it may be dispersed by dissolving the brightener in a suitable solvent and pouring the solution into water giving a finely divided precipitate. The dispersed brightener is usually applied to the fabric by heating in water together with the fabric for about 45 minutes at a temperature near the boil. The amount of brightener may vary a great deal, and in fact may range from 0.0035% to 0.5% based on the weight of the fiber.

The chloro-4-stilbeneamines are prepared in conventional manner by reduction of the corresponding chloro-4-nitrostilbenes.

The following examples will illustrate how the fluorescent naphthotriazoles are prepared and applied to synthetic fibers.

EXAMPLE I

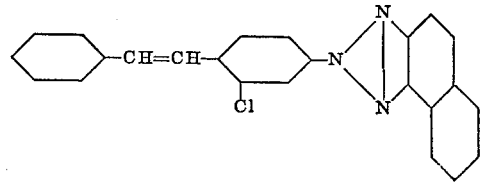

2-(3-chloro-4-styrylphenyl)-2H-naphtho[1,2]triazole

The intermediate having the formula:

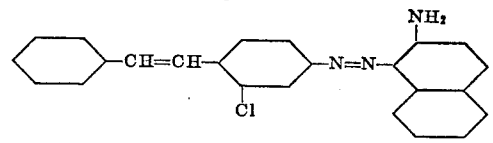

was prepared by mixing 26.7 grams of 2-chloro-4-stilbeneamine (0.116 mol.) (prepared by reduction of 2-chloro-4-nitrostilbene, described in Berichte 41, 2291–7) with 600 mls. of glacial acetic acid and heating the mixture to 95° C. To the hot solution were added 56 mls. of concentrated hydrochloric acid in 200 mls. of water. The material was cooled to 5° C. and 82 mls. of 10% aqueous sodium nitrite (wt./vol.) were added dropwise keeping the temperature below 10° C. The precipitate of amine hydrochloride became a clear solution after addition of the sodium nitrite. Stirring at not above 10° C. was continued for ½ hour, followed by addition of 6 mls. of 10% aqueous sulfamic acid.

Meanwhile, 16.8 grams of 2-naphthylamine (0.117 mol.) was dissolved in 400 mls. of water and 12 mls. of concentrated hydrochloric acid. After it had dissolved, the coupler was clarified. The coupler solution was added to the diazo, allowing the temperature to rise to 10–15° C. and stirred for 6 hours at 15° C. until a test for diazo and diazoamino was negative. The material was filtered and washed with 800 mls. of water.

*Oxidation of the intermediate*

The presscake of dye was mixed with 1200 mls. of picoline and heated to solution. At 95° C. a solution of 80 grams of copper sulfate in 200 mls. of water was added and the material refluxed with stirring at 95° C. for ½ hour. The cuprous and cupric copper was converted to sulfide by addition of 290 mls. of 20% (wt./vol.) aqueous sodium sulfide solution. The stirring was continued for 1 hour at 95° C., the material filtered and the copper sulfide cake washed with 1400 mls. of picoline preheated to 95° C. The filtrate was diluted to a volume of 4 liters, cooled to 30° C. and filtered. The cake was washed with 200 mls. of picoline and finally with 500 mls. of water. The cake was reslurried in 400 mls. of water, filtered and washed with water. The presscake was dried at 80° C. to give the desired brightener compound 2-(3-chloro-4-styrylphenyl)-2H-naphtho[1,2]triazole.

*Application*

50 milligrams of the 2-(3-chloro-4-styrylphenyl)-2H-naphtho[1,2]triazole were dissolved in 100 mls. of dimethylformamide. 1.0 ml. of the resulting solution was added to 150 mls. of 0.1% "Peregal O" solution (commercially available ethylene oxide condensation product as a dispersing agent). This total formulation was poured into a launderometer jar together with a 5.0 gram swatch of cellulose acetate fabric together with 10 steel balls. The material was heated at 190–200° F. for 45 minutes. The swatch was removed, rinsed and dried. The brightness of the dyed cloth was then read on an ultraviolet fluorescence photometer. The brightness reading of the brightener compound, dyed at 0.01% concentration on the weight of the fiber was 36.

In the same manner, but using 3.0 mls. of the above described dimethylformamide solution, a 0.03% dyeing was made on cellulose acetate fabric. A brightness reading of 50 was obtained.

In order to demonstrate the superiority of 2-(3-chloro-4-styrylphenyl)-2H-naphtho[1,2]triazole over the corresponding cyano substituted compound, i.e. 2-(3-cyano-4-styrylphenyl)-2H-naphtho[1,2]triazole, comparative dyeings on cellulose acetate were made of the two compounds as described above at a 0.01% concentration. Comparative brightness readings of two compounds were:

| Compound— | Comparative brightness reading |
|---|---|
| 2-(3-chloro-4-styrylphenyl)-2H-naphtho[1,2]triazole | 66 |
| 2-(3-cyano-4-styrylphenyl)-2H-naphtho[1,2]triazole | 38 |

An added advantage of the 2-(3-chloro-4-styrylphenyl)-2H-naphtho[1,2]triazole over the corresponding cyano compound is in ease and economy of production. To obtain the 2-chloro-4-nitrotoluene used as a starting material for condensation with a benzaldehyde to form the 2-chloro-4-nitrostilbene intermediate, p-nitrotoluene is chlorinated yielding 2-chloro-4-nitrotoluene in very good yield. Several methods may be employed to produce 2-cyano-4-nitrotoluene, but probably the most feasible method for commercial production is to start with o-toluic acid, convert it to o-toluyl chloride by treatment with thionyl chloride or other acid chloride forming agent, convert to the acid amide and then dehydrate to 2-cyano-4-nitrotoluene. Thus economy and ease of production of the 2-(3-chloro-4-styrylphenyl)-2H-naphtho[1,2]triazole in preference to the corresponding cyano brightener is obvious.

In order to demonstrate the superiority of 2-(3-chloro-4-styrylphenyl)-2H-naphtho[1,2]triazole over sulfonated derivatives of the same, comparative dyeings on cellulose acetate were made as described above at 0.01% and 0.03% concentrations. The comparative readings are given below:

| Compound | Comparative brightness reading at— | |
|---|---|---|
| | 0.01% Conc. | 0.03% Conc. |
| 2-(3-Chloro-4-styrylphenyl)-2H-naphtho[1,2]triazole | 36 | 50 |
| 2-[3-Chloro-4(2-sulfostyrylphenyl)]-2H-naphtho[1,2]triazole | 19 | 27 |
| 2-[3-Chloro-4(3-sulfostyrylphenyl)]-2H-naphtho[1,2]triazole | 18 | 28 |

50 milligrams of the 2-(3-chloro-4-styrylphenyl)-2H-naphtho[1,2]triazole were dissolved in 100 mls. of dimethyl formamide. 5 ml. of the resulting solution were added to 150 mls. of 0.1% "Peregal O" solution. This total formulation was poured into a launderometer jar together with a 5.0 gram swatch of "Dacron 54" polyester fabric together with 10 steel balls. The material was heated at 200° F. for one hour. The swatch was removed, rinsed and dried. The brightness of the dyed cloth was then read on an ultraviolet fluorescence photometer. The brightness reading of the brightener compound, dyed at 0.05% concentration on the weight of the fabric was 32.

In order to demonstrate the superiority of 2-(3-chloro-4-styrylphenyl)-2H-naphtho[1,2]triazole over the corresponding cyano substituted compound, and a sulfonated derivative, comparative dyeings were made on "Dacron 54" in the manner described above for dyeing "Dacron 54" at 0.01%, 0.03%, and 0.05% concentrations.

Comparative brightness readings were:

| Compound | Comparative Brightness Readings at— | | |
|---|---|---|---|
| | 0.01% Conc. | 0.03% Conc. | 0.05% Conc. |
| 2-(3-Chloro-4-styrylphenyl)-2H-naphtho[1,2]triazole | 22 | 28 | 32 |
| 2-(3-Cyano-4-styrylphenyl)-2H-naphtho[1,2]triazole | 19 | 21 | 22 |
| 2-(3-Chloro-4-2-sulfostyrylphenyl)-2H-naphtho[1,2]triazole | 2 | 4 | 7 |

In the same manner as Dacron 54 was dyed, Arnel triacetate fabric was dyed at 0.03% concentration of dye on the weight of the fabric. A brightness reading of 42 was obtained.

EXAMPLE II

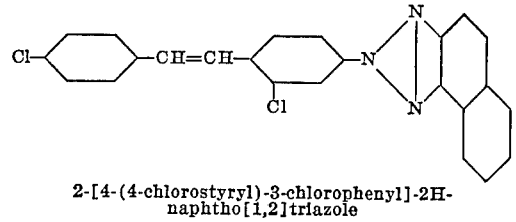

2-[4-(4-chlorostyryl)-3-chlorophenyl]-2H-naphtho[1,2]triazole

This compound was produced in the same sequence of reactions as in Example 1, except that 0.116 mol. of 2,4'-dichloro-4-stilbeneamine was substituted for the 2-chloro-4-stilbeneamine of Example 1. The series of reactions is as follows:

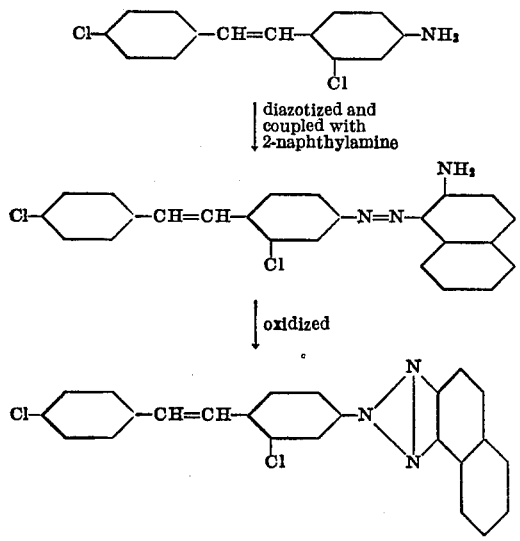

In the above, the 2,4'-dichloro-4-stilbeneamine was produced by reduction of 2,4'-dichloro-4-nitrostilbene in conventional manner as follows:

200 mls. of water, 35 grams of iron borings and 4 mls. of concentrated hydrochloric acid were slurried for 10 minutes at 95° C. Over a period of ¾ hour a hot solution of 23 grams of 2,4'-dichloro-4-nitrostilbene in 200 mls. of dimethyl formamide were added. The charge was stirred for 1 hour at 95° C. and 10 grams of sodium carbonate added to raise the pH to 9. The material was clarified by filtration of 90° C. The iron cake was washed with 250 mls. of dimethyl formamide. The filtrates were combined and treated with concentrated hydrochloric acid until acid to Congo paper. The precipitate which formed was filtered, washed with 300 mls. of cold water and dried at 80° C. give 2,4'-dichloro-4-stilbeneamino hydrochloride. The diazotization and coupling of this product with 2-naphthylamine was carried out as in Example 1, using an equivalent amount of 2,4'-dichloro-4-stilbeneamine for the 2-chloro-4-stilbeneamine of Example I. Oxidation to the corresponding triazole followed, according to the method of Example I.

The brightener was applied to polyester fiber (Dacron), and cellulose triacetate fiber (Arnel) as in Example I. At 0.03% concentration, comparative brightness readings were 55 for Dacron 54 and 41 for Arnel.

EXAMPLE III

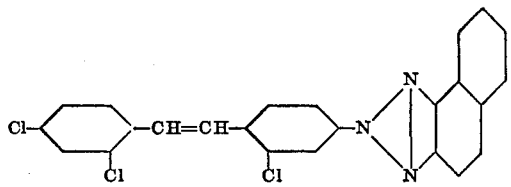

2-[4-(2,4-dichlorostyryl)-3-chlorophenyl]-2H-naphtho[1,2]triazole 2,2',4'-trichloro - 4 - nitrostilbene was prepared by the method of Ullman (Berichte 41, 2296) substituting an equivalent amount of 2,4-dichlorobenzaldehyde for benzaldehyde in the process of condensing 2-chloro-4-nitrotoluene with benzaldehyde in the presence of piperidine. The compound was reduced to 2,2',4'-trichloro-4-stilbene- amine in the same manner as the reduction of 2-chloro-4-nitrostilbene in Example I. The 2,2',4'-trichloro-4-stilbeneamine was diazotized and coupled with 2-naphthylamine, then oxidized with copper sulfate by the method described in Example I. The brightener thus formed was applied to polyester fiber (Dacron), cellulose acetate and cellulose triacetate (Arnel) according to the method in Example I.

EXAMPLE IV

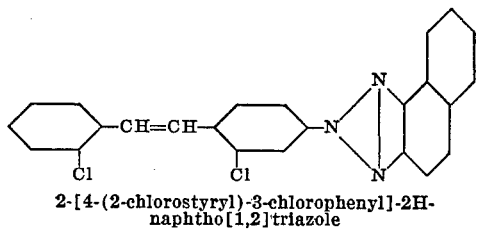

2-[4-(2-chlorostyryl)-3-chlorophenyl]-2H-naphtho[1,2]triazole 2,2'-dichloro-4-nitrostilbene was prepared by the Ullman method (Berichte 41, 2296) substituting an equivalent amount of o-chlorobenzaldehyde for benzaldehyde in the process of condensing 2-chloro-4-nitrotoluene with benzaldehyde in the presence of piperidine. The compound was then reduced to the corresponding amine according to the method of reducing the 2-chloro-4-nitrostilbene to the corresponding amine as in Example I. The amine was then diazotized and coupled with 2-naphthylamine, then oxidized to 2-[(2-chlorostyryl)-3-chlorophenyl]-2H-naphtho[1,2]triazole according to the method described in Example I.

The triazole brightener was then applied to polyester material, cellulose acetate and cellulose triacetate according to the method described in Example I.

EXAMPLE V

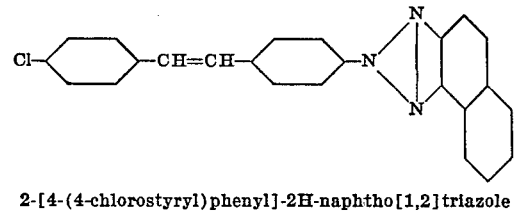

2-[4-(4-chlorostyryl)phenyl]-2H-naphtho[1,2]triazole

4'-chloro-4-nitrostilbene was prepared by the method of Ullman (Berichte 41, 2296) substituting 4-chlorobenzaldehyde for benzaldehyde in the process of condensing 4-nitrotoluene with benzaldehyde in the presence of piperidine. The compound was reduced to 4'-chloro-4-nitrostilbeneamine in the same manner as the reduction of 2-chloro-4-nitrostilbene in Example I. The 4'-chloro-4-stilbeneamine was diazotized and coupled with 2-naphthylamine, then oxidized with copper sulfate by the method described in Example I. The brightener thus formed was applied to polyester fiber (Dacron), cellulose acetate and cellulose triacetate (Arnel) according to the method of Example I.

EXAMPLE VI

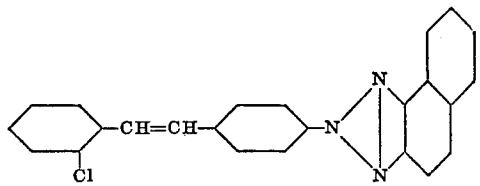

2-[4-(2-chlorostyryl)phenyl]-2H-naphtho[1,2]triazole

2'-chloro-4-nitrostilbene was prepared by the method of Ullman (Berichte 41, 2296) substituting 2-chlorobenzaldehyde for benzaldehyde in the process of condensing 4-nitrotoluene with benzaldehyde in the presence piperidine. The compound was reduced to 2'-chloro-4-nitrostilbene in the same manner as the reduction of 2-chloro-4-nitrostilbene in Example I. The 2'-chloro-4-stilbeneamine was diazotized and coupled with 2-naphthylamine, then oxidized with copper sulfate by the method described in Example I. The brightener thus formed was applied to polyester fiber (Dacron 54), cellulose acetate, and cellulose triacetate (Arnel) according to the method of Example I.

We claim:

1. A fluorescent naphthotriazole having the following formula:

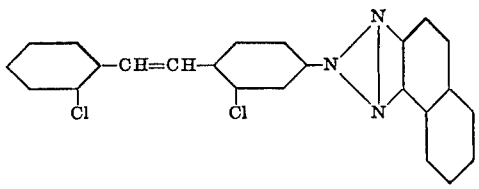

2. A fluorescent naphthotriazole having the following formula:

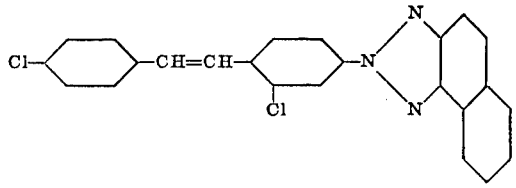

References Cited by the Examiner

UNITED STATES PATENTS

| 2,972,611 | 2/1961 | Zweidler et al. | 260—240 |
| 3,058,989 | 10/1962 | Buell et al. | 260—240 |
| 3,062,814 | 11/1962 | Buell | 260—240 |
| 3,133,916 | 5/1964 | Duennenberger et al. | 260—240 |

FOREIGN PATENTS

| 781,821 | 8/1957 | Great Britain. |
| 1,262,740 | 4/1961 | France. |

JOHN D. RANDOLPH, *Primary Examiner.*

NICHOLAS S. RIZZO, WALTER A. MODANCE,
*Examiners.*